United States Patent
Kim et al.

(10) Patent No.: US 7,285,313 B2
(45) Date of Patent: Oct. 23, 2007

(54) ACRYLIC PRESSURE-SENSITIVE ADHESIVE COMPOSITION FOR POLARIZING FILM

(75) Inventors: Se-Ra Kim, Daejeon (KR); In-Cheon Han, Seoul (KR); Suk-ky Chang, Daejeon (KR); Hye-Ran Seong, Seoul (KR)

(73) Assignee: LG Chem Ltd., Seoul (KR)

(*) Notice: Subject to any disclaimer, the term of this patent is extended or adjusted under 35 U.S.C. 154(b) by 213 days.

(21) Appl. No.: 11/037,461

(22) Filed: Jan. 19, 2005

(65) Prior Publication Data

US 2005/0181148 A1 Aug. 18, 2005

(30) Foreign Application Priority Data

Jan. 20, 2004 (KR) .................. 10-2004-0004448

(51) Int. Cl.
*B32B 7/12* (2006.01)
*G02B 5/30* (2006.01)

(52) U.S. Cl. ............... 428/1.55; 428/1.31; 428/355 R; 428/355 AC; 349/122; 349/96; 524/560; 524/563

(58) Field of Classification Search ............... 428/1.55, 428/1.31, 355 R, 355 AC; 349/122, 96; 524/560–564
See application file for complete search history.

(56) References Cited

U.S. PATENT DOCUMENTS 4,759,983 A * 7/1988 Knutson et al. ............ 428/343

6,800,366 B2 * 10/2004 Chang et al. .......... 428/355 AC
2003/0054166 A1 * 3/2003 Chang et al. .......... 428/355 AC

FOREIGN PATENT DOCUMENTS

| JP | 60-207101 | 10/1985 |
| JP | 10-140119 | 5/1998 |
| JP | 10-279907 | 10/1998 |
| JP | 2002-121521 | 4/2002 |
| JP | 2002-309208 | 10/2002 |
| JP | 2003-034781 | 2/2003 |
| JP | 2003-193013 | 7/2003 |
| JP | 2003-193014 | 7/2003 |
| JP | 2004-002782 | 1/2004 |
| JP | 2004-091500 | 3/2004 |
| JP | 2004-224873 | 8/2004 |
| WO | WO 02/50209 A1 | 6/2002 |
| WO | WO 03/070849 A1 | 8/2003 |

* cited by examiner

*Primary Examiner*—Rena Dye
*Assistant Examiner*—Sow-Fun Hon
(74) *Attorney, Agent, or Firm*—McKenna Long & Aldridge LLP

(57) ABSTRACT

Provided is an acrylic pressure-sensitive adhesive composition for a polarizing film comprising an acrylic copolymer copolymerized from (meth)acrylic ester monomers having different glass transition temperatures.

The acrylic pressure-sensitive adhesive composition of the present invention can minimize the problem of light leakage due to shrinkage or expansion of a polarizing film attached to a liquid crystal display panel because it has very superior stress relaxation ability while maintaining superior major properties such as adhesion durability, cuttability, etc.

6 Claims, No Drawings

ACRYLIC PRESSURE-SENSITIVE ADHESIVE COMPOSITION FOR POLARIZING FILM

BACKGROUND OF THE INVENTION (a) Field of the Invention

The present invention relates to an acrylic pressure-sensitive adhesive composition for a polarizing film, more particularly to a pressure-sensitive adhesive composition for a polarizing film capable of solving the problem of light leakage, a polarizing film prepared using the same and a liquid crystal display employing the same.

(b) Description of the Related Art

Basically, a liquid crystal cell containing liquid crystal, a polarizing film and an adhesive layer or a pressure-sensitive adhesive layer for joining the two are required to manufacture a liquid crystal display. In addition, a phase retardation film, a compensation film for wide view angle, a brightness enhancement film, etc. may be further attached to the polarizing film to improve performance of the liquid crystal display.

Typically, a liquid crystal display comprises a uniformly aligned liquid crystal layer; a polarizing film comprising a liquid crystal cell, which consists of a transparent glass plate or a plastic plate including a transparent electrode layer and an adhesive layer or a pressure-sensitive adhesive layer; a phase retardation film; and additional functional film layers.

The polarizing film consists of a uniformly aligned iodine compound or dichroic polarizing material. To protect these polarizing elements, a protection film made of triacetyl cellulose (TAC), etc. is used. The polarizing film may further comprise a phase retardation film having an anisotropic molecular alignment, a compensation film for wide view angle such as an optically designed liquid crystal film, etc.

Because the aforementioned films are made of materials having different molecular structures and compositions, they have different physical properties. Especially, under a specific thermal and/or humidity condition, materials having an anisotropic molecular alignment shrink or expand, which causes the lack of dimensional stability. As a result, if the polarizing film is fixed by a pressure-sensitive adhesive, a shear stress caused the thermal and/or humidity condition remains, so that light leakage occurs at the region where the stress is concentrated.

One way to solve the problem of light leakage is to reduce the shrinkage of the polarizing film at the thermal and/or humidity condition. However, it is very difficult to remove the stress applied to a liquid crystal panel to which a polarizing film consisting of different materials has been attached.

Rubbers, acryls and silicones are commonly used as pressure-sensitive adhesives. Among these, acrylic pressure-sensitive adhesives are used the most widely in manufacturing high performance pressure-sensitive adhesive compositions.

However, when a polarizing film manufactured using such a pressure-sensitive adhesive is used for a long time (under a specific thermal and/or humidity condition) in a liquid crystal display, stress tends to concentrate because of the shrinkage of the polarizing film. To solve this problem, the adhesive layer needs to have a stress relaxation ability.

U.S. Pat. No. 5,795,650 offered such ability to a pressure-sensitive adhesive by adding a plasticizer to the adhesive layer. However, the light leakage problem could not be solved and it was known that the plasticizer significantly impairs adhesion property of the adhesive because of its surface transfer characteristic. As a result, the adhesive does not solve such durability and reliability problems as bubble and edge lifting.

Japan Patent Publication No. Hei 10-279907 proposed a method of solving the light leakage problem by offering a stress relaxation ability, which was achieved by mixing an acrylic polymer having a high molecular weight with an acrylic polymer having a low molecular weight of 30,000 or less. However, the decrease of the light leakage is slight and the adhesion durability and reliability are reduced significantly because of the surface transfer characteristic. In addition, the cutting property worsens.

It is also possible to control crosslinking density with a chemical bonding, in order to offer stress relaxation ability to the adhesive. But, this method is also insufficient to solve stress concentration at the polarizing film. Besides, if the crosslinking density is too low, the durability may worsen. There is an alternative of offering fluidity to the adhesive by adding a plasticizer or a material having a low molecular weight. But, the added materials may significantly worsen the adhesive performance because of their surface transfer characteristic.

Thus, the development of a new adhesive for a polarizing film capable of solving the light leakage problem without compromising such major characteristics as adhesion durability and cuttability and a polarizing film using the same are urgently needed.

SUMMARY OF THE INVENTION

It is an aspect of the present invention to provide an acrylic pressure-sensitive adhesive composition for a polarizing film capable of solving the light leakage problem without compromising such major characteristics of an adhesive as adhesion durability and cuttability.

It is another aspect of the present invention to provide a polarizing film using the acrylic pressure-sensitive adhesive composition.

It is still another aspect of the present invention to provide a liquid crystal display comprising the polarizing film.

DETAILED DESCRIPTION OF THE PREFERRED EMBODIMENTS

In order to attain the aspects, the present invention provides an acrylic pressure-sensitive adhesive composition for a polarizing film comprising a) 100 parts by weight of an acrylic copolymer prepared from copolymerization of
  i) 35-94.9 parts by weight of a (meth)acrylic ester monomer for preparing a homopolymer having a glass transition temperature ranging from −45° C. to 10° C.;
  ii) 5-50 parts by weight of a (meth)acrylic ester monomer for preparing a homopolymer having a glass transition temperature ranging from −90° C. to −50° C.; and
  iii) 0.1-15 parts by weight of a vinylic monomer, an acrylic monomer or a mixture thereof having a functional group that can be crosslinked; and b) 0.01-10 parts by weight of a multifunctional crosslinking agent.

The present invention also provides a polarizing film comprising the acrylic pressure-sensitive adhesive composition on one or both sides of a polarizing film as an adhesive layer.

The polarizing film may further comprise at least one layer selected from the group consisting of a protection film, a reflection film, a phase retardation film, a compensation film for wide view angle and a brightness enhancement film.

The present invention also provides a liquid crystal display comprising a liquid crystal panel wherein the polarizing film is attached on one or both sides of a liquid crystal cell.

Hereunder is given a detailed description of the present invention.

The present invention relates to an acrylic pressure-sensitive adhesive composition having a superior stress relaxation ability, which comprises an acrylic copolymer copolymerized from monomers for preparing a homopolymer, which have different properties and glass transition temperatures, and a polarizing film prepared using the same.

The present invention is characterized in minimizing light leakage caused by stress concentration, which occurs because of shrinkage or expansion of a polarizing film attached to a liquid crystal display panel after long use, by offering mobility to the polymer chains of an adhesive.

The present invention adjusts the structure of an adhesive. That is, the light leakage problem is solved by controlling the entanglement and flexibility of polymer chains, while maintaining a crosslinking density through a chemical bonding. Specifically, the problem of light leakage is solved by minimizing residual stress of the adhesive, while maintaining durability and cuttability, by adequately using a monomer for preparing a homopolymer having a low glass transition temperature (high flexibility) and a monomer for preparing a homopolymer having a high glass transition temperature (low flexibility). In case only a monomer having a low glass transition temperature is used, cohesive force of the adhesive decreases, although the problem of light leakage is solved, thereby causing durability and cuttability problems. Thus, a monomer having a higher glass transition temperature is used together to reinforce cohesive force. In case only a monomer having a high glass transition temperature is used, flexibility is low, although the durability and cuttability problem is solved, thereby causing light leakage problem. Thus, a monomer having a lower glass transition temperature is used together to reinforce flexibility.

The adhesive composition of the present invention may be used for any adhesive or pressure-sensitive adhesive materials, including acrylic, silicone, rubber, urethane, polyester and epoxy adhesives, without limitation. Preferably, it is used for an acrylic adhesive.

The acrylic pressure-sensitive adhesive composition of the present invention comprises a) an acrylic copolymer copolymerized from a (meth)acrylic ester monomer for preparing a homopolymer having a glass transition temperature ranging from −45° C. to 10° C.; a (meth)acrylic ester monomer for preparing a homopolymer having a glass transition temperature ranging from −90° C. to −50° C.; and a vinylic monomer, an acrylic monomer or a mixture thereof having a functional group that can be crosslinked; and b) a multifunctional crosslinking agent.

Hereunder is given a detailed description of each constituent of the adhesive composition.

The (meth)acrylic ester monomer for preparing a homopolymer having a glass transition temperature ranging from −45° C. to 10° C. maintains adhesion durability, cuttability, etc. by reinforcing cohesive force. The monomer is used in 35-94.9 parts by weight, preferably in 45-90 parts by weight, per 100 parts by weight of a) the acrylic copolymer. If the content of the monomer exceeds 94.9 parts by weight, the ability to relax residual stress abates. Otherwise, if it is below 35 parts by weight, cohesive force of the adhesive decreases, thereby impairing such properties as adhesion durability and cuttability. For the (meth)acrylic ester monomer having a glass transition temperature ranging from −45° C. to 10° C., n-butyl acrylate, isobutyl acrylate, propyl acrylate, ethyl acrylate, methyl acrylate, 3-methylbutyl acrylate, n-hexyl methacrylate, n-octyl methacrylate, n-tetradecyl methacrylate, etc. may be used alone or in combination.

The (meth)acrylic ester monomer for preparing a homopolymer having a glass transition temperature ranging from −90° C. to −50° C. increases flexibility of the polymer chain, thereby offering stress relaxation effect and solving the problem of light leakage. The monomer is used in 5-50 parts by weight, preferably in 10-40 parts by weight, per 100 parts by weight of a) the acrylic copolymer. If the content of the monomer exceeds 50 parts by weight, cohesive force decreases although the residual stress relaxation effect is improved, thereby causing durability and reliability problems. Otherwise, if it is below 5 parts by weight, the residual stress relaxation effect decreases. For the (meth)acrylic ester monomer having a glass transition temperature ranging from −90° C. to −50° C., n-octyl acrylate, 2-ethylhexyl acrylate, 2-ethylbutyl acrylate, hexyl acrylate, heptyl acrylate, nonyl acrylate, pentyl acrylate, isooctyl acrylate, n-decyl methacrylate, n-dodecyl methacrylate, etc. may be used alone or in combination.

Of the vinylic monomer, the acrylic monomer or the mixture thereof having a functional group that can be crosslinked, the vinylic monomer having a hydroxy group reacts with a crosslinking agent to offer cohesive force by chemical bonding, so that the cohesive force of the adhesive does not decrease at high temperature or high humidity. The acrylic monomer having a functional group that can be crosslinked, which may be an α,β-unsaturated carboxylic monomer, also offers adhesion strength or cohesive force.

The vinylic monomer, the acrylic monomer or the mixture thereof is preferably comprised in 0.1-15 parts by weight. If the content of the monomer is below 0.1 part by weight, cohesive force may decrease at high temperature or high humidity. Otherwise, if it exceeds 15 parts by weight, fluidity decreases and cohesive force increases, thereby reducing adhesion strength.

For example, 2-hydroxyethyl(meth)acrylate, 2-hydroxypropyl(meth)acrylate, 2-hydroxyethylene glycol(meth)acrylate, 2-hydroxypropylene glycol(meth)acrylate, etc. may be used for the vinylic monomer. Also, any vinylic monomer having a hydroxy group may be used. If required, these monomers can be used alone or in combination.

Preferably, the acrylic monomer having a functional group that can be crosslinked is an α,β-unsaturated carboxylic monomer. Non-limiting examples of the α,β-unsaturated carboxylic monomer are acrylic acid, methacrylic acid, acrylic acid dimer, itaconic acid, maleic acid, maleic anhydride, etc. These monomers may be used alone or in combination.

The aforementioned monomers are copolymerized to prepare the acrylic copolymer. Preferably, the acrylic copolymer has a molecular weight ranging from 200,000 to 2,000,000, in consideration of adhesion property, coating ability, etc. Copolymerization of the acrylic copolymer may be performed by solution polymerization, photo polymerization, bulk polymerization, suspension polymerization or emulsion polymerization. Preferably, the acrylic copolymer is prepared by solution polymerization at a polymerization temperature of 50-140° C. by adding an initiator to a uniform mixture of the monomers.

b) The crosslinking agent reacts with the carboxylic group and the hydroxy group to increase cohesive force of the adhesive. Preferably, the crosslinking agent is comprised in 0.01-10 parts by weight per 100 parts by weight of a) the acrylic copolymer. The crosslinking agent may be isocyanate, epoxy, aziridine, metal chelate, etc. Among these, isocyanate is advantageous in use. Examples of the isocyanate crosslinking agent are tolylene diisocyanate, xylene diisocyanate, diphenylmetane diisocyanate, hexamethylene diisocyanate, isoform diisocyanate, tetramethylxylene diisocyanate, naphthalene diisocyanate and adducts thereof with a polyol like trimethylolpropane. Examples of the epoxy crosslinking agent are ethylene glycol diglycidyl ether, triglycidyl ether, trimethylolpropane triglycidyl ether, N,N,N',N'-tetraglycidylethylene diamine and glycerine diglycidyl ether. Examples of the aziridine crosslinking agent are N,N'-toluene-2,4-bis(1-aziridine carboxide), N,N'-diphenyl-metane-4,4'-bis(1-aziridine carboxide), triethylene melamine, and tri-1-azirdinylphosphine oxide. Examples of the metal chelate crosslinking agent are compounds wherein such multivalent metals as aluminum, iron, zinc, tin, titanium, antimony, magnesium and vanadium are coordinated with acetylacetone or ethyl acetoacetate.

The pressure-sensitive adhesive composition of the present invention may be prepared by mixing the acrylic copolymer with the crosslinking agent according to the common method.

The multifunctional crosslinking agent is required not to be crosslinked during formation of the adhesive layer for uniform coating. After the coating process is finished, an elastic, cohesive and strong adhesive layer is obtained passing through drying and aging. Because of the strong cohesive force of the adhesive, such properties as durability, reliability and cuttability are improved.

Considering the physical property balance of the acrylic pressure-sensitive adhesive composition, the adhesive may have a crosslinking density of 5-95%, more preferably 15-80%. This crosslinking density is the wt % value of the crosslinked portion of the acrylic pressure-sensitive adhesive determined by the general gel content measuring method.

The adhesive composition of the present invention may further comprise a silane coupling agent. The silane coupling agent improves adhesion stability when attached to a glass plate, thereby improving heat and moisture resistance. In particular, the silane coupling agent improves adhesion reliability when the adhesive is exposed to high temperature and high humidity for a long time. It may be comprised in 0.005-5 parts by weight per 100 parts by weight of the acrylic copolymer. For the silane coupling agent, vinyltrimethoxysilane, vinyltriethoxysilane, γ-glycidoxypropyltrimethoxysilane, γ-methacryloxypropyltrimethoxysilane, etc. may be used alone or in combination.

The pressure-sensitive adhesive composition of the present invention may further comprise a tackifiers in 1-100 parts by weight per 100 parts by weight of the acrylic copolymer to control adhesive property. If the tackifiers are used too much, compatibility or cohesive force of the adhesive may worsen. For the tackifiers, a (hydrated) hydrocarbon resin, a (hydrated) rosin resin, a (hydrated) rosin ester resin, a (hydrated) terpene resin, a (hydrated) terpene phenol resin, a polymerized rosin resin, a polymerized rosin ester resin, etc. may be used alone or in combination.

Besides, pressure-sensitive adhesive composition of the present invention may further comprise a plasticizer, an epoxy resin, a hardener, etc. depending on the purpose of use. Further, a UV stabilizer, an antioxidant, a colorant, a modifier, a filler, etc. may be added according to the purpose of use.

The present invention also provides a polarizing film comprising the acrylic pressure-sensitive adhesive composition as an adhesive layer.

The polarizing film of the present invention comprises an adhesive layer formed from the pressure-sensitive adhesive composition on one or both sides of the polarizing film. The polarizing element and the polarizing film are not particularly limited.

Preferably, the polarizing film may be obtained by adding such polarizing ingredients as iodine or dichroic dye to, for example, a polyvinyl alcohol resin. Thickness of the polarizing film is not particularly limited. For the polyvinyl alcohol resin, polyvinyl alcohol, polyvinyl formal, polyvinyl acetal and ethylene, vinyl acetate copolymer, etc. may be used.

On both sides of the polarizing film, a cellulose film of triacetyl cellulose, etc., a polycarbonate film, a polyester film of polyethylene terephthalate, etc., a polyether sulfone film, a polyolefin film of polyethylene, polypropylene, cyclo or norbonene polyolefin, ethylene-propylene copolymer, etc. may be formed to give a multilayer structure. Thickness of such protecting film is not particularly limited, either.

The Method of forming a pressure-sensitive adhesive layer on the polarizing film is not particularly limited. For example, the pressure-sensitive adhesive may be directly coated on the polarizing film using a bar coater, etc. Alternatively, the adhesive may be coated on a thin substrate and then the pressure-sensitive adhesive layer may be transferred to the surface of the polarizing film after drying, and then aged.

In addition, at least one of a protection layer, a reflection layer, an anti-glare layer, a phase retardation film, compensation film for a wide view angle, a brightness enhancement film, etc. may be formed on the polarizing film of the present invention.

The polarizing film in which the pressure-sensitive adhesive of the present invention is used may be used for any common liquid crystal display. Preferably, a liquid crystal display may be manufactured by attaching the polarizing film on one or both sides of a liquid crystal cell.

As described above, the pressure-sensitive adhesive of the present invention composition is advantageous in solving the problem of light leakage by relaxing the stress, which is caused by the shrinkage of the polarizing film, when used for a long time under thermal and/or humidity condition, without compromising major properties such as adhesion durability and cuttability.

Hereinafter, the present invention is described further through examples. However, the following examples are only given for the understanding of the present invention and the present invention is not limited to or by them.

EXAMPLE 1

<Preparation of Acrylic Copolymer>

A monomer mixture comprising 69.5 parts by weight of n-butyl acrylate (BA), 28 parts by weight of n-octyl acrylate (n-OA), 1.0 parts by weight of acrylic acid (AA) and 1.5 part by weight of hydroxyethyl(meth)acrylate (2-HEMA) was added to a 1 L reactor equipped with a nitrogen gas reflux unit and a cooler. Then, 120 parts by weight of ethyl acetate (EAc) was added as solvent. Purging was performed for 60 minutes using nitrogen gas to remove oxygen. Temperature was maintained at 60° C. and 0.03 part by weight of azobisisobutyronitrile (AIBN) diluted to 45% with ethyl acetate was added as reaction initiator. Reaction was performed for 8 hours to obtain an acrylic copolymer.

<Preparation of Adhesive Layers>

To 100 parts by weight of the acrylic copolymer obtained above was added 2.0 parts by weight of tolylene diisocyanate adduct (TDI-1) of trimethylolpropane isocyanate as crosslinking agent. The mixture was diluted to an adequate concentration considering coating ability. The mixture was coated on a release paper. The paper was dried to obtain a uniform adhesive layer having a thickness of 30 microns.

<Lamination Process>

The adhesive layer was laminated on an iodine polarizing film having a thickness 185 microns. The resultant polarizing film was cut for evaluation. Evaluation result is given in Table 2 below.

<Evaluation Test>

Durability and Reliability

The polarizing film (90 mm×170 mm) coated with the adhesive was attached on both sides of a glass plate (110 mm×190 mm×0.7 mm) with the axes of light absorption crossed with each other. A pressure of about 5 kg/cm$^2$ was applied, so that bubbles or impurities do not exist. The resultant sample was kept under the condition of 60° C. and 90% RH for 1,000 hours in order to evaluate heat and moisture resistance. The lack of heat and moisture resistance was confirmed if bubbles or edge lifting occurred. Heat resistance was evaluated by observing bubbles or edge lifting after keeping the sample at 80° C. for 1,000 hours. Before observing the sample, it was kept at room temperature for 24 hours. The evaluation criteria were as follows.

○: No bubbles and no edge lifting were observed
  Δ: A few bubbles and a little edge lifting were observed
  ×: A large amount of bubbles and edge lifting were observed Light Transmission Uniformity (Light Leakage)

A Backlight was illuminated through the same sample in a dark room. It was observed if there is any light leakage. The coated polarizing film (200 mm×200 mm) was attached on both sides of a glass plate (210 mm×210 mm×0.7 mm) with an angle of 90°. Light transmission uniformity was evaluated by the following standard.

○: No light leaking was observed by the naked eye.
  Δ: A little non-uniform light transmission was observed.
  ×: A severe light leaking from the edge of polarizers was observed.

Cuttability

The polarizing film was cut with a Thomson cutter. The cross-section of the part in which the pressure-sensitive adhesive layer had been cut was observed. Evaluation standard was as follows.

○: The degree of adhesive pull out after cutting was less than 0.2 mm.
  Δ: The degree of adhesive pull out from the edge was from 0.2 to 0.5 mm.
  ×: The degree of adhesive pull out from the edge was greater than 0.5 mm.

EXAMPLES 2-4

Acrylic copolymers were prepared in the same manner of Example 1, except that copolymerization was performed according to the composition given in Table 1 and that the content of the crosslinking agent was changed as in Table 2. Mixing and lamination were performed as in Example 1. Durability and reliability, light transmission uniformity and cuttability were evaluated. The result is given in Table 2.

COMPARATIVE EXAMPLES 1-3

Acrylic copolymers were prepared in the same manner of Example 1, except that copolymerization was performed according to the composition given in Table 1 and that the content of the crosslinking agent was changed as in Table 2. Mixing and lamination were performed as in Example 1. Durability and reliability, light transmission uniformity and cuttability were evaluated. The result is given in Table 2.

TABLE 1

| Category (parts by weight) | Composition of acrylic copolymer | | | | | | | |
|---|---|---|---|---|---|---|---|---|
| | Example 1 | Example 2 | Example 3 | Example 4 | Comp. Example 1 | Comp. Example 2 | Comp. Example 3 | Comp. Example 4 |
| n-BA | 69.5 | 54.0 | 87.0 | 78.5 | 89.1 | | 22.5 | 94.0 |
| EA | | 4.2 | | | | | | 1.5 |
| MA | | | | | 8.0 | | | |
| n-OA | 28.0 | | 10.0 | 5.0 | | 96.0 | 70.0 | 2.0 |
| HA | | 40.0 | | 14.0 | | | 5.7 | |
| 2-HEMA | 1.5 | 1.8 | | 1.5 | 1.9 | 1.0 | 1.8 | 1.5 |
| AA | 1.0 | | 3.0 | 1.0 | 1.0 | 3.0 | | 1.0 |
| AIBN | 0.03 | 0.03 | 0.03 | 0.03 | 0.03 | 0.03 | 0.03 | 0.03 |
| EAc | 120 | 120 | 120 | 120 | 120 | 120 | 120 | 120 | n-BA: n-Butyl acrylate
EA: Ethyl acrylate
MA: Methyl acrylate
n-OA: n-Octyl acrylate
HA: Hexyl acrylate
2-HEMA: 2-Hydroxyethyl methacrylate
AA: Acrylic acid
AIBN: Azobisisobutyronitrile
EAc: Ethyl acetate

TABLE 2

| Category | | Example 1 | Example 2 | Example 3 | Example 4 | Comp. Example 1 | Comp. Example 2 | Comp. Example 3 | Comp. Example 4 |
|---|---|---|---|---|---|---|---|---|---|
| Adhesive composition (parts by weight) | Acrylic copolymer | 100 | 100 | 100 | 100 | 100 | 100 | 100 | 100 |
| | Cross linking agent | 2.0 | 2.0 | 2.0 | 2.0 | 2.0 | 2.0 | 2.0 | 2.0 |
| Physical properties | Durability and reliability | ○ | ○ | ○ | ○ | ○ | X | X | ○ |
| | Light transmission uniformity | ○ | ○ | ○ | ○ | X | ○ | ○ | X |
| | Cuttability | ○ | ○ | ○ | ○ | ○ | X | □ | ○ |

As seen in Table 2, the pressure-sensitive adhesive compositions of the present invention (Examples 1-4) showed superior durability and reliability, light transmission uniformity and cuttability, compared with those of Comparative Examples 1-4.

As apparent from the above description, the present invention provides an acrylic pressure-sensitive adhesive composition for a polarizing film capable of solving the problem of light leakage by relaxing the stress generated by shrinkage of the polarizing film, when used under a thermal and/or humidity condition for a long time, without impairing major properties such as adhesion durability, cuttability, etc. Therefore, the pressure-sensitive adhesive composition of the present invention can solve the problem of light leakage due to stress concentration, when applied to a polarizing film of a liquid crystal display, even after long use.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An acrylic pressure-sensitive adhesive composition for a polarizing film comprising
   a) 100 parts by weight of an acrylic copolymer prepared from copolymerization of
      i) 35-94.9 parts by weight of a (meth)acrylic ester monomer for preparing a homopolymer having a glass transition temperature ranging from −45° C. to 10° C. that is at least one selected from the group consisting of n-butyl acrylate, isobutyl acrylate, propylacrylate, ethyl acrylate, methyl acrylate, 3-methylbutyl acrylate, n-hexyl methacrylate, n-octyl methacrylate and n-tetradecyl methacrylate;
      ii) 5-50 parts by weight of a (meth)acrylic ester monomer for preparing a homopolymer having a glass transition temperature ranging from −90° C. to −50° C. that is at least one selected from the group consisting of n-octyl acrylate, 2-ethylhexyl acrylate, 2-ethylbutyl acrylate, hexyl acrylate, heptyl acrylate, nonyl acrylate, pentyl acrylate, isooctyl acrylate, n-decyl methacrylate and n-dodecyl methacrylate; and
      iii) 0.1-15 parts by weight of a vinylic monomer, an acrylic monomer or a mixture thereof having a functional group that can be crosslinked, wherein the vinylic monomer is at least one selected from the group consisting of 2-hydroxyethyl (meth)acrylate, 2-hydroxypropyl (meth)acrylate, 2-hydroxyethylene glycol (meth)acrylate and 2-hydroxypropylene glycol (meth)acrylate, and the acrylic monomer is at least one selected from the group consisting of acrylic acid, methacrylic acid, acrylic acid dimer, itaconic acid, maleic acid and maleic anhydride; and
   b) 0.01-10 parts by weight of a multifunctional crosslinking agent, which is at least one selected from the group consisting of an isocyanate compound, an epoxy compound, an aziridine compound and a metal chelate compound.

2. The acrylic pressure-sensitive adhesive composition of claim 1, wherein a) the acrylic copolymer has a molecular weight ranging from 200,000 to 2,000,000.

3. The acrylic pressure-sensitive adhesive composition of claim 1, which has a crosslinking density of 5-95%.

4. A polarizing film comprising any of the acrylic pressure-sensitive adhesive composition of any one of claims 1, 2 and 3 on one or both sides of the polarizing film.

5. The polarizing film of claim 4, which further comprises at least one layer of a protection film, a reflection film, a phase retardation film, a compensation film for wide view angle or a brightness enhancement film.

6. A liquid crystal display comprising a liquid crystal panel wherein the polarizing film of claim 4 is attached on one or both sides of a liquid crystal cell.

* * * * *